United States Patent [19]
Rabinovitz

[11] Patent Number: 5,822,184
[45] Date of Patent: Oct. 13, 1998

[54] MODULAR DISK DRIVE ASSEMBLY OPERATIVELY MOUNTABLE IN INDUSTRY STANDARD EXPANSION BAYS OF PERSONAL DESKTOP COMPUTERS

[76] Inventor: Josef Rabinovitz, 5229 Beckford Ave., Tarzana, Calif. 91356

[21] Appl. No.: 755,241

[22] Filed: Nov. 22, 1996

Related U.S. Application Data

[63] Continuation of Ser. No. 281,934, Jul. 28, 1994, abandoned.

[51] Int. Cl.[6] ................................. G06F 1/16; H05K 7/10
[52] U.S. Cl. ........................... 361/685; 361/683; 361/727
[58] Field of Search .................................... 361/683, 684, 361/685, 686, 724–727; 364/708.1; G06F 1/16

[56] References Cited

U.S. PATENT DOCUMENTS

| | | | |
|---|---|---|---|
| 4,754,397 | 6/1988 | Varaiya et al. | 364/200 |
| 5,067,041 | 11/1991 | Cooke et al. | 361/394 |
| 5,224,019 | 6/1993 | Wong et al. | 361/393 |
| 5,420,750 | 5/1995 | Freige et al. | 361/695 |

*Primary Examiner*—Lynn D. Feild
*Attorney, Agent, or Firm*—Oppenheimer Wolff & Donnelly LLP

[57] ABSTRACT

A modular data device assembly for a computer is disclosed, wherein the assembly has a housing that is designed to fit into a conventional, industry standard size expansion bay. Individual plug-in data storage devices such as hard disk drives or CD-ROM drives are disposed vertically in a stacked formation within the housing. A motherboard with plug-in connectors to which the drives are connected allows easy replacement of defective data devices, which devices slide in or out. The disk drives and modular data device assemblies may be arrayed in series or in parallel to a controller. By its modular structure and redundant storage functions, the present invention benefits from what is known as Redundant Array of Inexpensive Disk principle.

28 Claims, 8 Drawing Sheets

MODULAR DISK DRIVE ASSEMBLY OPERATIVELY MOUNTABLE IN INDUSTRY STANDARD EXPANSION BAYS OF PERSONAL DESKTOP COMPUTERS

CROSS-REFERENCE TO RELATED APPLICATION

This is a continuation of application Ser. No. 08/281,934 filed Jul. 28, 1994, now abandoned.

BACKGROUND OF THE INVENTION

1. Field of the Invention

The present invention relates to an arrangement for mounting data devices in a computer. In particular, the present invention relates to a modular data device assembly adapted to mount in an industry standard size expansion bay.

2. Prior Art and Related Information

There have been a number of attempts at making the components of a computer easily replaceable and interchangeable. Hence, the rise in popularity of modular components and the hardware to adapt the replaced component to a conventional computer.

For example, U.S. Pat. No. 5,227,954 to Twigg discloses a mounting arrangement which allows drives of different sizes to be mounted in a drive dock. Specifically, Twigg discloses hardware necessary to mount, for example, full height, half height, or third height drives in a conventional size drive dock. To that end, the Twigg device provides mounting plates that have upper and lower ridges for mounting a single disk drive of varying size within the single drive dock.

U.S. Pat. No. 5,222,897 to Collins et al. discloses a circuit board inserter/ejector system for inserting a circuit board into a back plane in a chassis and for ejecting the circuit board from the back plane of the chassis. The inserter/ejector system can be used with a magnetic disk drive to facilitate insertion and removal thereof within a computer.

U.S. Pat. No. 5,067,041 to Cooke et al. discloses an apparatus for reducing electromagnetic radiation from a computer device. The Cooke apparatus is comprised of an electrically conductive housing and a non-conductive drive mounting structure situated within the housing. The drive mounting structure includes a plurality of bays in communication with an opening in the housing, and an electrically conductive retainer that is situated over the opening to hold the disk drives in the bays.

U.S. Pat. No. 5,224,019 discloses a modular computer chassis comprising a main chassis to which a motherboard is attached and a subchassis attachable to the main chassis. The subchassis holds at least one computer component and is electrically connected to the motherboard. In this manner, the computer component is separable from the main chassis by removing the subchassis therefrom.

U.S. Pat. No. 5,309,323 to Gray et al. discloses a removable electrical unit with combined grip and release mechanism. Gray shows removable disk drives each of which is mountable into a corresponding device bay in front of the subsystem chassis, wherein each removable disk drive incorporates a soft stop and release mechanism. Similarly, U.S. Pat. No. 5,224,020 to Golledge et al. discloses a modular electrical apparatus which comprises a plurality of customer removable electrical devices such as disk drives. The devices and support units are all blind pluggable into a removable central electrical distribution unit. Likewise, U.S. Pat. Nos. 5,006,959 and 5,119,497 to Freige et al. disclose a computer apparatus with modular components including segregated functional units like a disk array, various plug-in card packages, power/fan unit, and a motherboard.

Another goal for moving towards modular computer components is to improve reliability. One concept in the field of disk drives is known as Redundant Array of Inexpensive Disk (RAID), wherein a number of disk drives are interconnected in an array for redundant storage of data. Thus, failure of one disk drive does not destroy irreplaceable data.

A possible early example of the RAID concept is disclosed in U.S. Pat. No. 4,754,397 to Varaiya et al. Varaiya teaches a housing array for containing a plurality of hardware element modules such as disk drives, a plurality of modularized power supplies, and plural power distribution modules, each being connected to a separate source of primary facility power. Each module is self-aligning and blind-installable within the housing and may be installed and removed without tools, without disturbing the electrical cabling within the cabinet, and automatically by a maintenance robot.

Despite the advances in designing modular components and associated hardware for computers, there is still a need for a modular component that easily adapts to conventional size restraints, yet benefits from RAID concepts.

SUMMARY OF THE INVENTION

It is, therefore, an object of the present invention to provide a modular data device assembly for a computer that holds a number of interchangeable data devices, wherein the physical dimensions of the assembly permit it to be installed within the confines of a single expansion bay of a computer. It is another object of the present invention to employ RAID concepts using multiple data devices within a singular modular assembly. It is another object of the present invention to provide a modular data device assembly that employs industry standard plug-in connectors. It is yet another object to provide a modular data device assembly that is modular and which has data devices that are themselves modular. It is still another object of the present invention to provide a modular data device assembly that can be adapted to any size computer, including micro, mini, laptop, palm top, desk top, and mainframe computers.

In order to accomplish the foregoing objects, the present invention is directed to a modular data device assembly for a computer comprising a housing having an open front and a back, wherein the housing includes exterior dimensions corresponding to an industry standard expansion bay. There is a plurality of slots disposed inside the housing, a plurality of modular data devices disposed in the plurality of slots, a motherboard disposed in the back of the housing, connected to the data devices, a power source connected to the motherboard, a bus interconnecting the data devices, and a controller disposed in the computer connected to the data bus. In a preferred embodiment, the modular data device comprises a CD-ROM drive, a floppy disk drive, a hard disk drive, etc.

Accordingly, in a preferred embodiment of the present invention, two or more hard disk drives can be mounted within the housing, which has appropriate exterior dimensions for insertion into a conventional, industry standard size expansion bay of a computer. By use of a single expansion bay, the present invention expands the storage capacity of the computer by many times.

As a result, the present invention provides a modular data device assembly that can be used with a conventional computer without any modifications. The modular data device assembly uses multiple data devices, such as disk drives, that can be accessed in parallel in order to exploit the RAID concept. Failures of individual data devices can be rectified by replacement of the modular data device. Failure of the entire data device assembly is rectified by replacement of the entire assembly.

In the preferred embodiment, the present invention utilizes plug-in connectors so that replacement of any component or the entire assembly is simply a matter of pulling the component out of the bay or slot to disengage the interfacing connectors, and replacing the defective component with a new component that merely has to be plugged in.

The present invention, therefore, easily adapts to the millions of computers already in use. The storage capacity of each of those computers is increased many fold without requiring any re-wiring or physical modification. The reliability of operation of these computers now equipped with the present invention improves by virtue of the implementation of RAID technology to the modular data device assembly. The present invention, therefore, enhances the power of a conventional computer without a major investment in modification to hardware or software.

BRIEF DESCRIPTION OF THE DRAWINGS

The objects, features and advantages of the present invention will be apparent to one skilled in the art from reading the following detailed description in which.

DETAILED DESCRIPTION OF THE INVENTION

The following specification describes a modular data device assembly for a computer. In the description, specific materials and configurations are set forth in order to provide a more complete understanding of the present invention. But it is understood by those skilled in the art that the present invention can be practiced without those specific details. In some instances, well-known elements are not described precisely so as not to obscure the invention.

The present invention is directed to a modular data device assembly for a computer, comprising a housing holding a plurality of modular data devices disposed in the housing. A motherboard is disposed in the back of the housing, and a bus interconnects the data devices which operate under the direction of a controller. Although the following describes the present invention relative to a laptop, desk top, or like personal computer, it is clear that the present invention is easily adaptable to a computer of any size or capacity.

Figure 1:
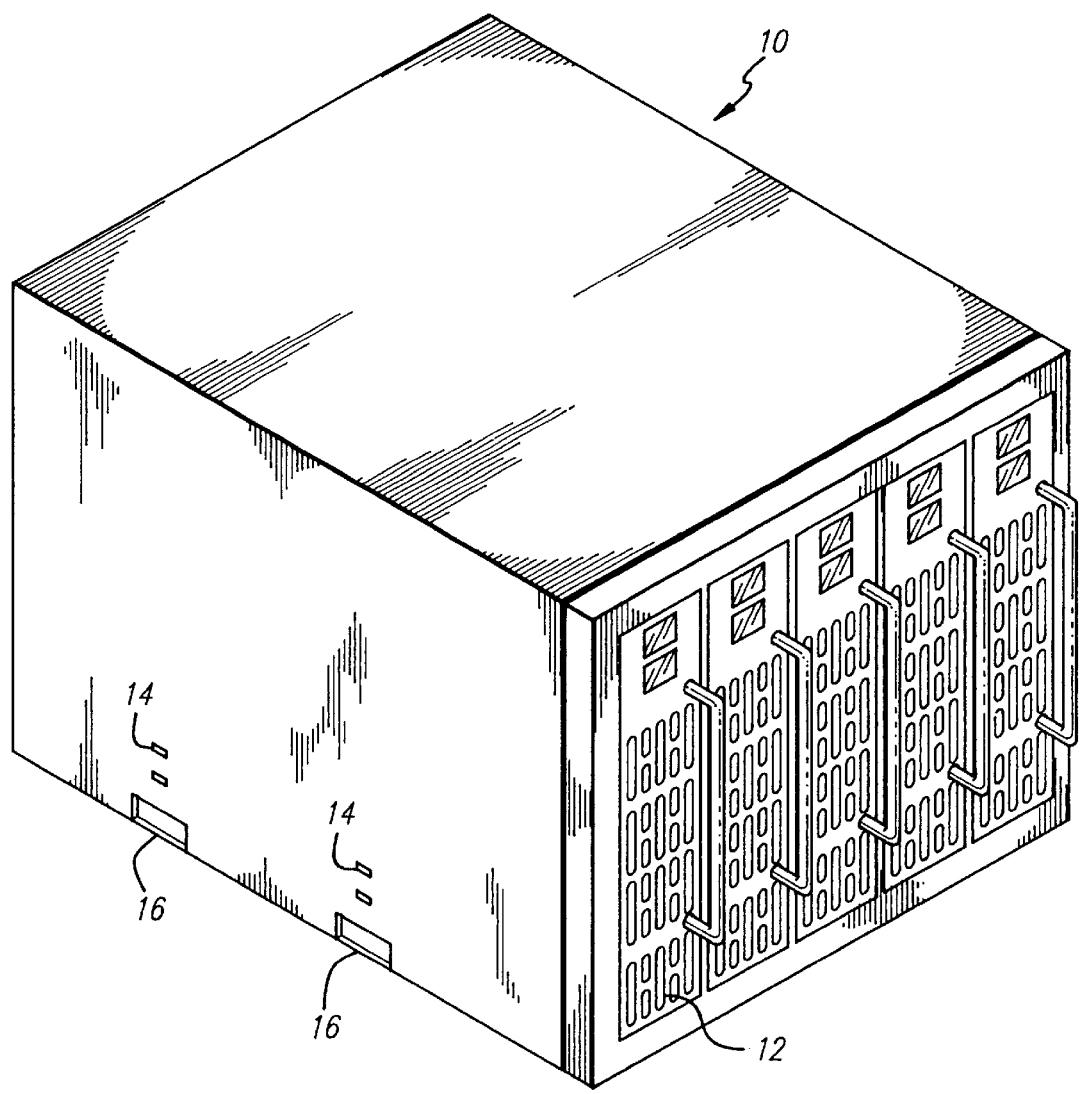
FIG. 1 is a perspective view of a preferred embodiment of the present invention modular data device assembly.
Figure 2:
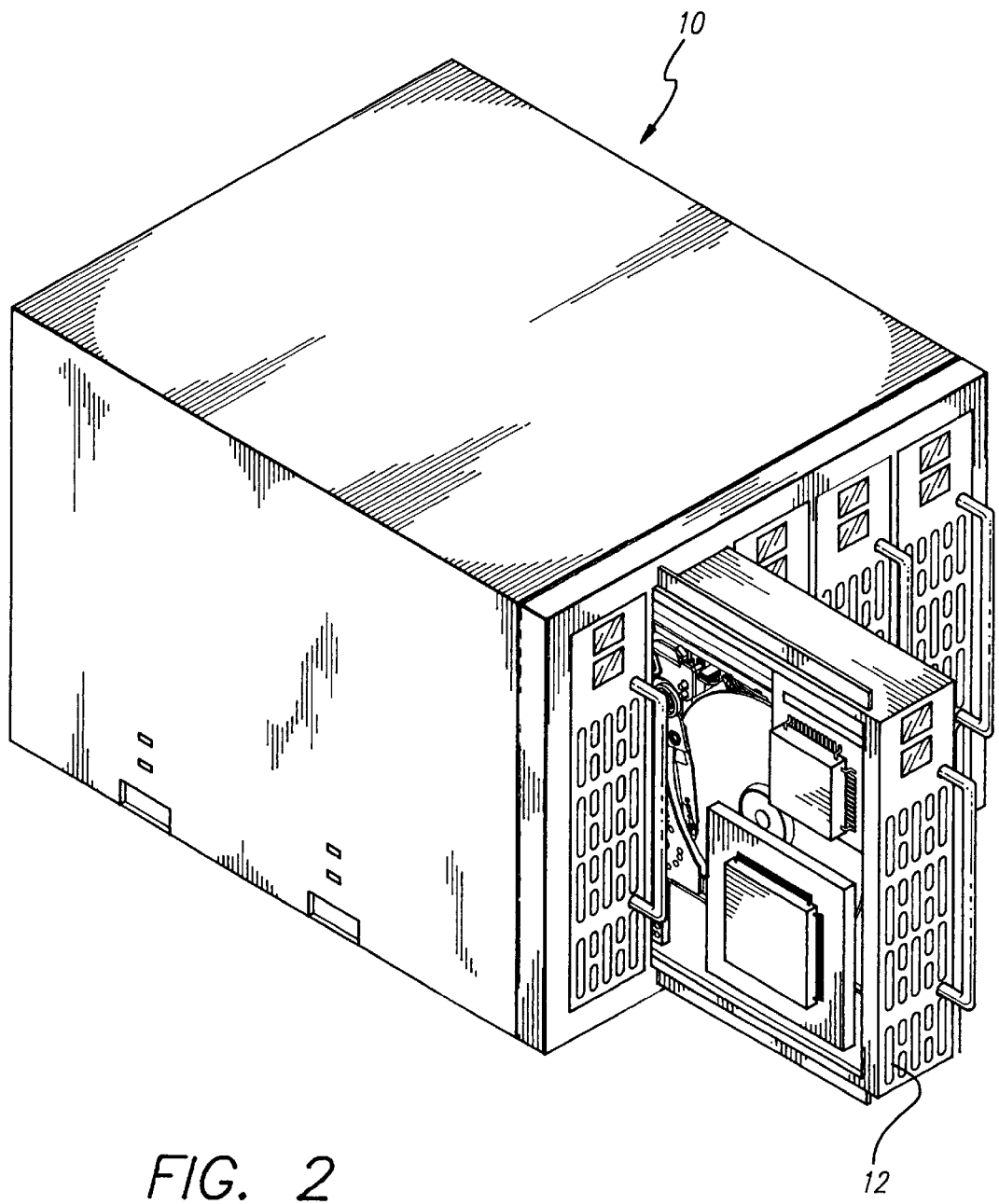
FIG. 2 is a perspective view of the present invention, wherein one disk drive has been partially removed from the housing to expose the electronics.

FIG. 1 provides a perspective view of a preferred embodiment of the present invention modular data device assembly for a computer. In this embodiment, the present invention provides a housing 10 having a predetermined height, width, and depth. In the front of the housing 10 are modular data devices, in this case, hard disk drives 12. Of course, the present invention can be adapted for use with other modular data devices such as CD-ROM drives, tape drives, floppy drives, RAM cards, PCMCIA cards, and related data devices. In the exemplary embodiment, the disk drives 12 are mounted vertically and slide into the housing 10 through the front as shown in FIG. 2.

Figure 8:
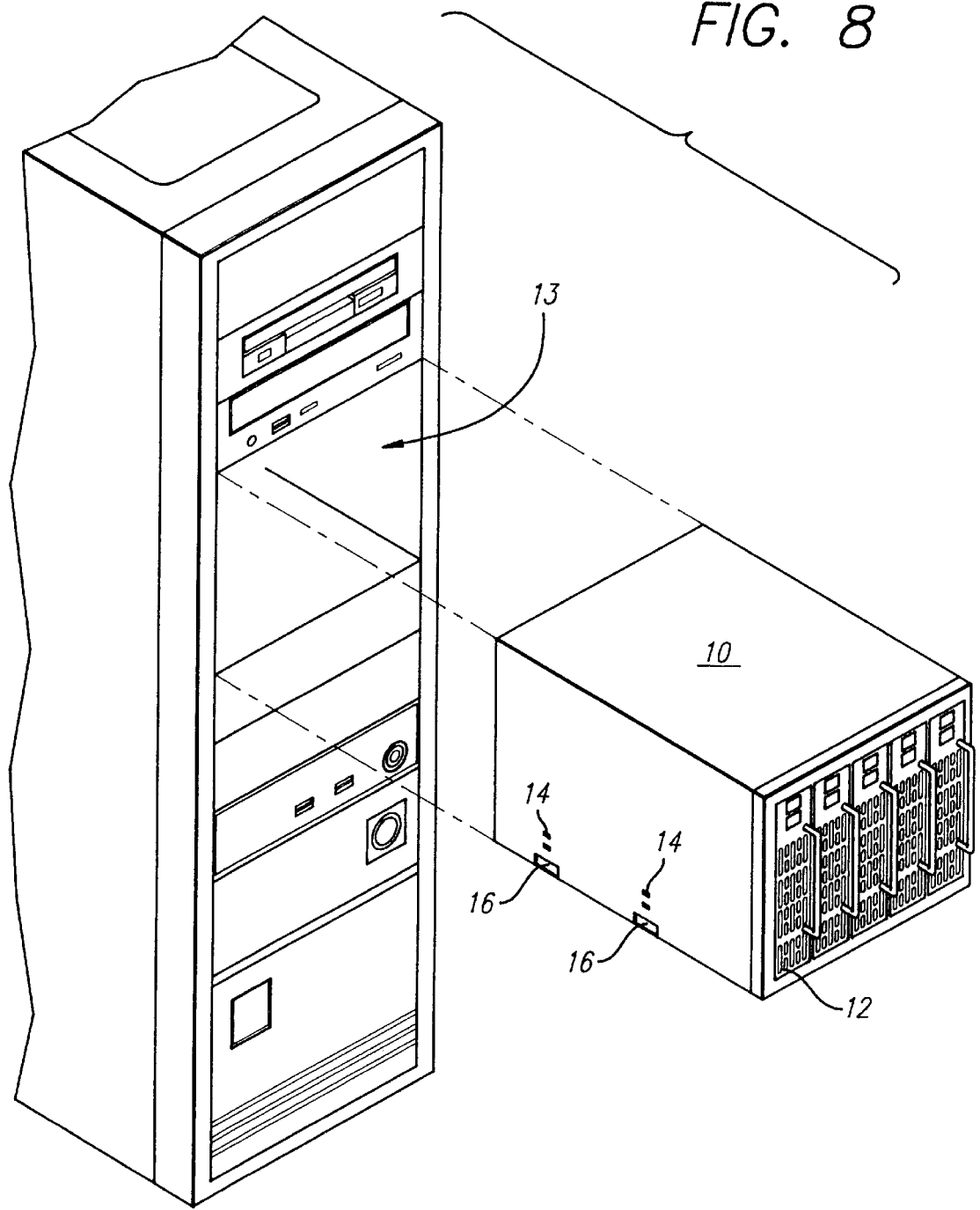
FIG. 8 is a perspective view showing the modular data device assembly being inserted into an operative position in an expansion bay of a personal desktop computer.

The present invention, although described in the preferred embodiments to be adapted for mounting inside a computer expansion bay (see reference numeral 13 in FIG. 8), can be used external to the computer housing. That is, because the present invention is a modular, self-contained unit, it can be operated external to the computer. To this end, the disk drive controller, as is known in the art, can be mounted inside the computer enclosure or outside, perhaps inside the present invention assembly.

Figure 4:
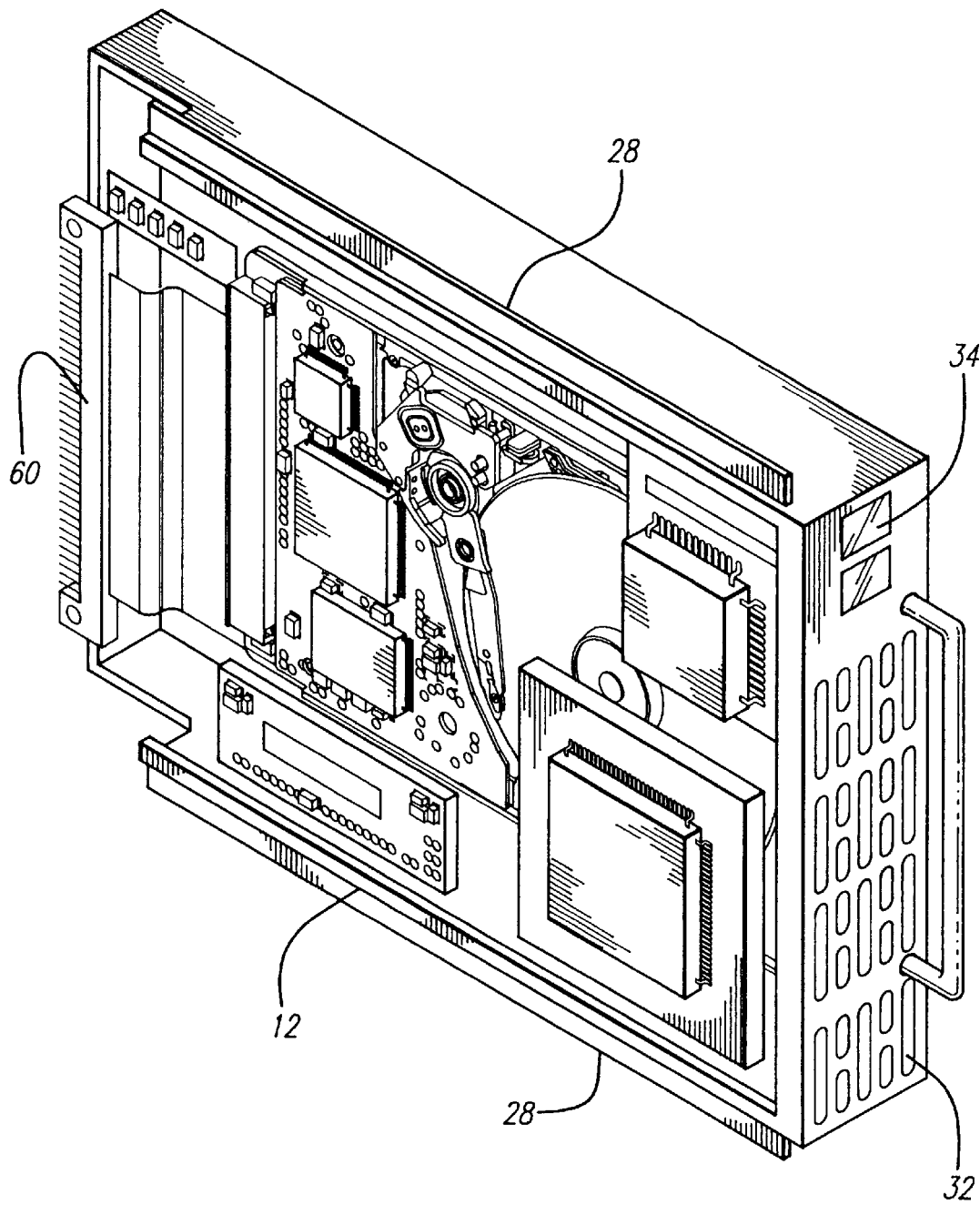
FIG. 4 is a perspective view of an exemplary embodiment disk drive with a back having a connector for mounting to the motherboard.

The disk drive 12 can be of any given configuration such as the one illustrated in FIG. 4. Such disk drives are readily available in the commercial market and well-known in the art. The standard drive shown in FIG. 4 includes flanges 28 for mounting in the housing 10. The back of the standard disk drive can have drive-ready connectors. Optionally, the disk drive 12 if not drive-ready can be converted with an 80-pin high density drive ready connector (hot plug type) 60 to make the drive 12 RAID ready. Other types of connectors can be used depending upon design requirements.

As seen in the exemplary embodiment of FIG. 1, the outer dimensions such as the length, width, and depth of the housing in the present invention are designed to fit within the confines of a single, industry standard size expansion slot or bay of a personal computer. The present invention contains five hard disk drives 12 of possibly 3.5-inch or 2.5-inch size drives that can be inserted into a conventional 5.25-inch form factor full height disk drive bay, or a 5.25-inch full height plus 5.25-inch half height disk drive bay. Needless to say, the present invention modular data device assembly is easily adapted to disk drive bays of other sizes, whereby the assembly is made larger or smaller by varying the size and number of each modular data device within the assembly.

The conventional outer dimensions of the present invention housing 10 allows the assembly to be easily adapted for use in many types of computers. Optional mounting slots 16 and screw holes 1 are provided on the sides of the housing 10 for conventional installation within a disk drive bay. The housing 10, of course, may be installed in an expansion bay not necessarily dedicated to a disk drive.

Figure 3:
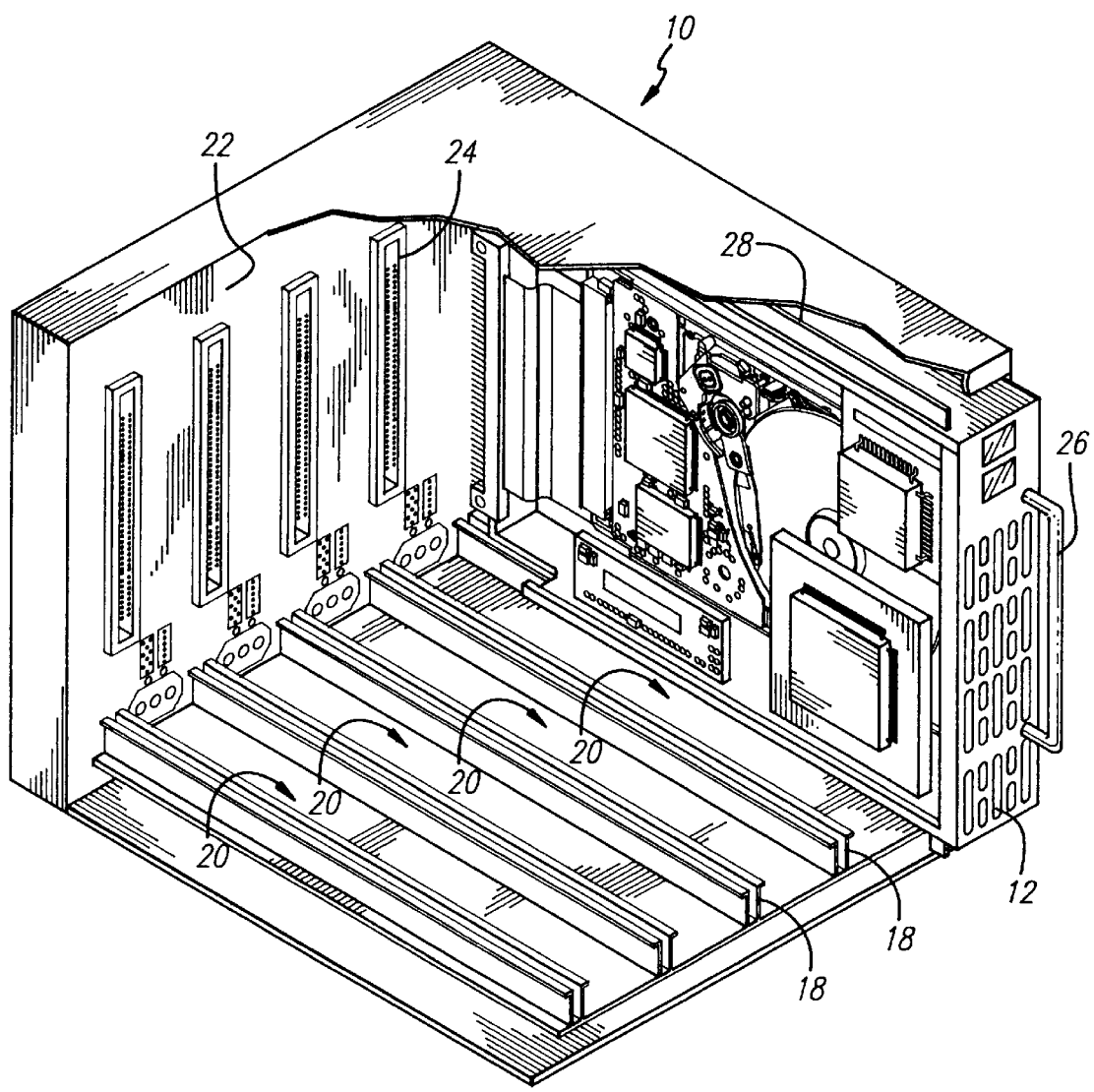
FIG. 3 is a cut away view showing the disk drive mounting hardware within the modular data device assembly and showing the plug-in connectors of the motherboard.

FIG. 3 provides a cut-away view of the present invention to expose the interior. In this exemplary embodiment, the disk drives 12 slide along rails 18 within a slot 20. At the back of the housing 10 is a backplane 22. On the interior of the motherboard 22 are industry standard plug-in connectors 24 corresponding to the disk drives 12. The plug-in connectors 24 further enhance the modular characteristic of the present invention by permitting the individual disk drives 12 to be installed or removed without tools, wherein the electrical connections are completed or broken by pushing or pulling on the disk drive 12. Indeed, for this purpose, each disk drive 12 preferably includes a handle 26.

Each disk drive 12 preferably includes outward extending flanges 28 on either side that slide along the rails 18, thereby aligning the electrical connector plugs at the back of the disk drive 12 with the complementary connectors 24 on the motherboard 22. Indeed, the disk drive 12 may utilize an edge card connector on the back for engagement with the connectors 24. Alternatively, if the data device is disposed on a printed circuit board, the PCB slides along the rail into engagement with the connector.

A bus interconnects all of the individual disk drives 12 or data devices preferably leading to a SCSI in/out port at the back of the housing 10. Two such ports 30 are shown in the perspective view of FIG. 5 showing the back of housing 10.

The disk drives 12 can be of any configuration known in the art. Cooling vents 32 are disposed in the front. Optional LEDs 34 indicate operation of the disk drive 12.

Figure 5:
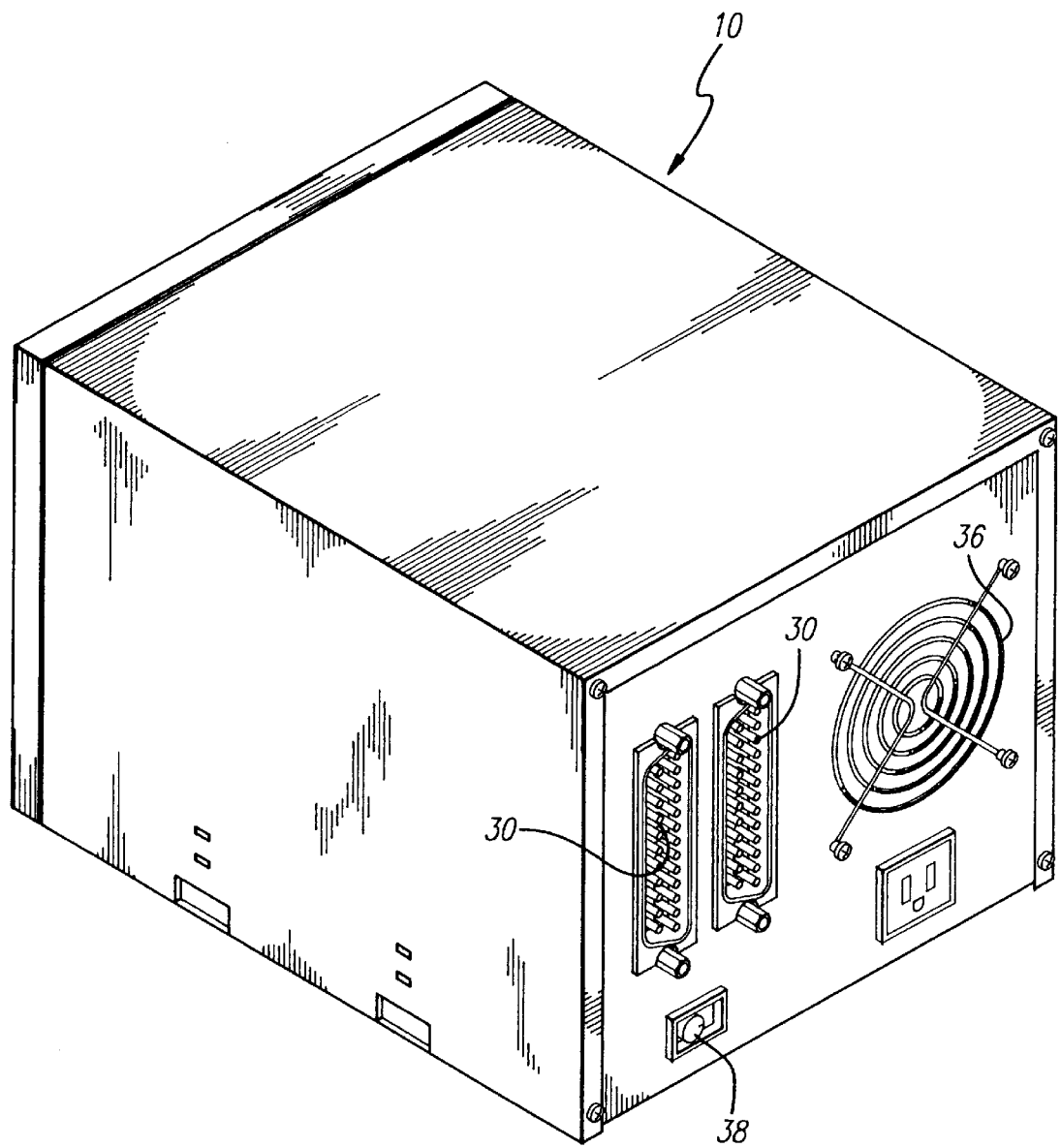
FIG. 5 is a perspective view of the backside of the present invention modular data device assembly showing a cooling fan, I/O ports, a power socket, and a power switch.

FIG. 5 shows a back end view of the housing 10. There is an optional cooling fan 36 that draws air through the front cooling vents 32 of the disk drives 12. The cooling fan 36 is preferably controlled by interior temperatures within the housing though a thermistor, a rheostat, or similar device known in the art. There is an optional on/off switch 38 as well as a grounded socket 40 through which power is fed to the disk drives.

Figure 7:
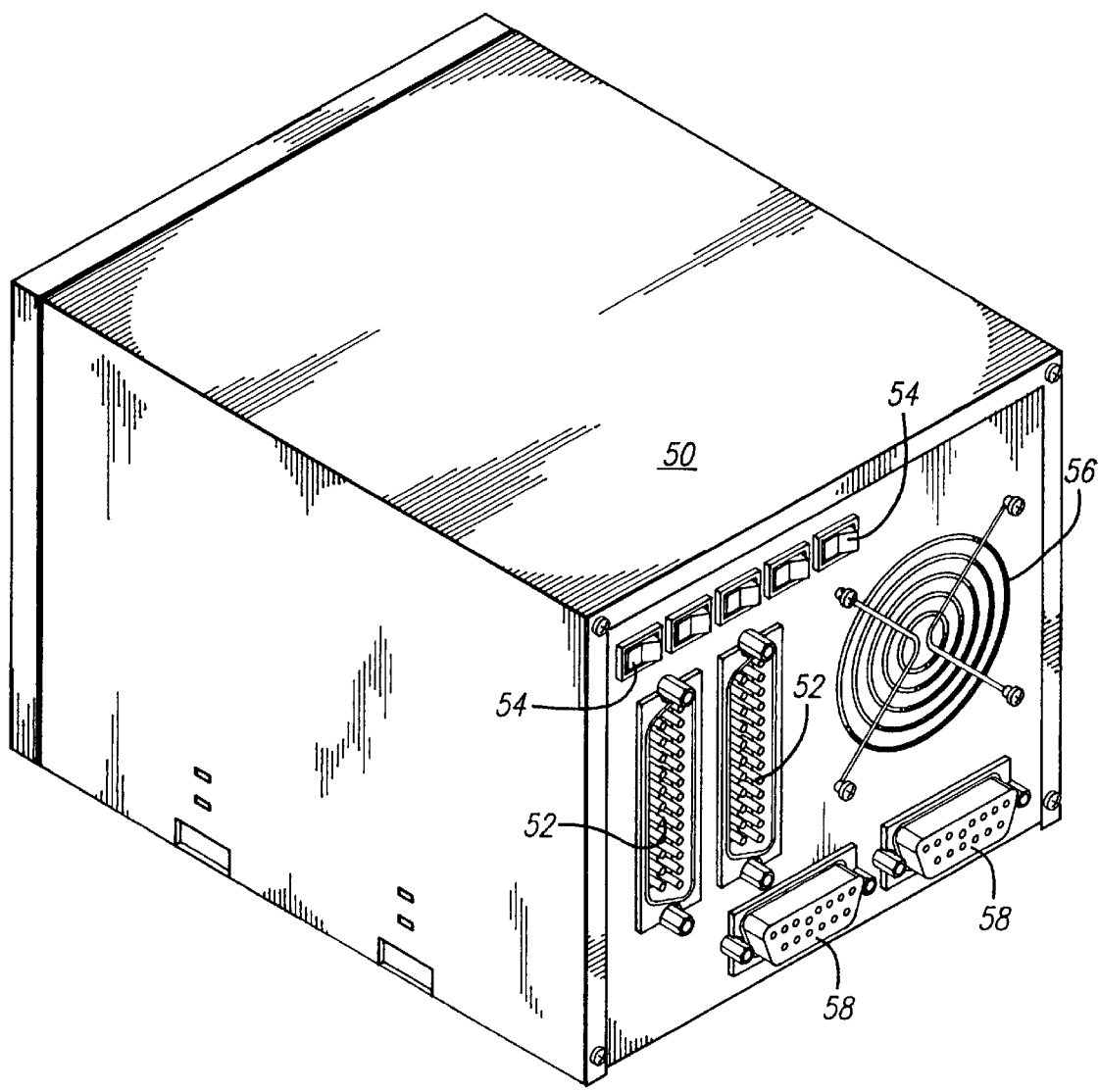
FIG. 7 is a perspective view of the backside of an alternative embodiment of the present invention modular data device assembly showing 2×4 pin power connectors and five ID switches.

FIG. 7 shows an alternative embodiment of the housing 50. In this embodiment, there are preferably two ports 52, five disk drive ID switches 54, a cooling fan 56, and two DC power connectors (disk drive type) 58. Of course, this configuration is optional and various other hardware known in the art can be used.

Figure 6A:
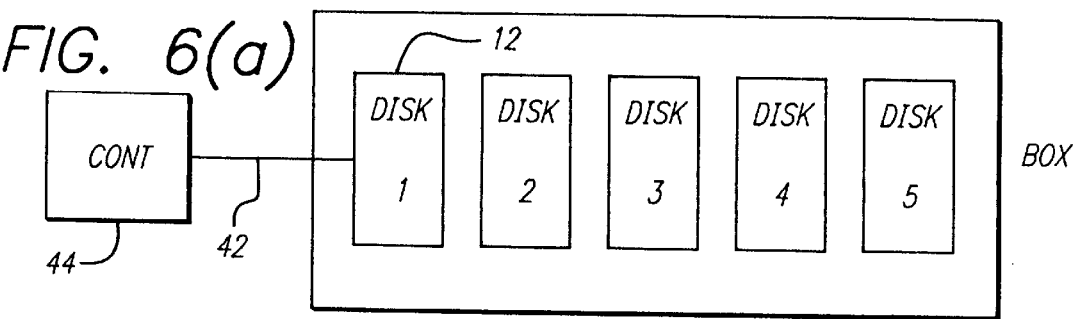
FIGS. 6(a)–(c) are block diagrams representing various arrangements of the present invention assembly.
Figure 6B:
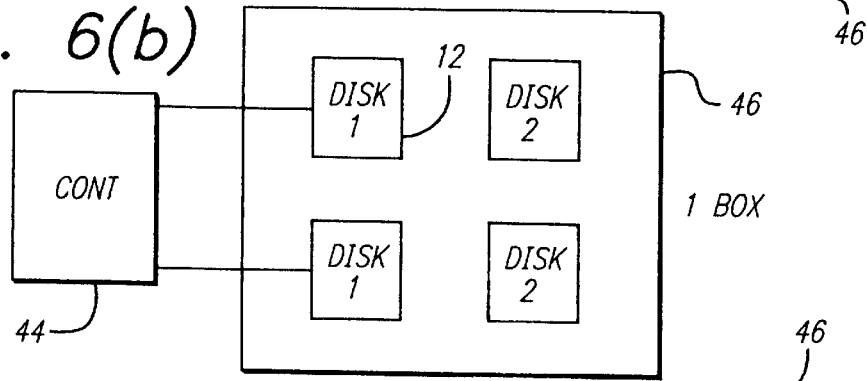
Figure 6C:
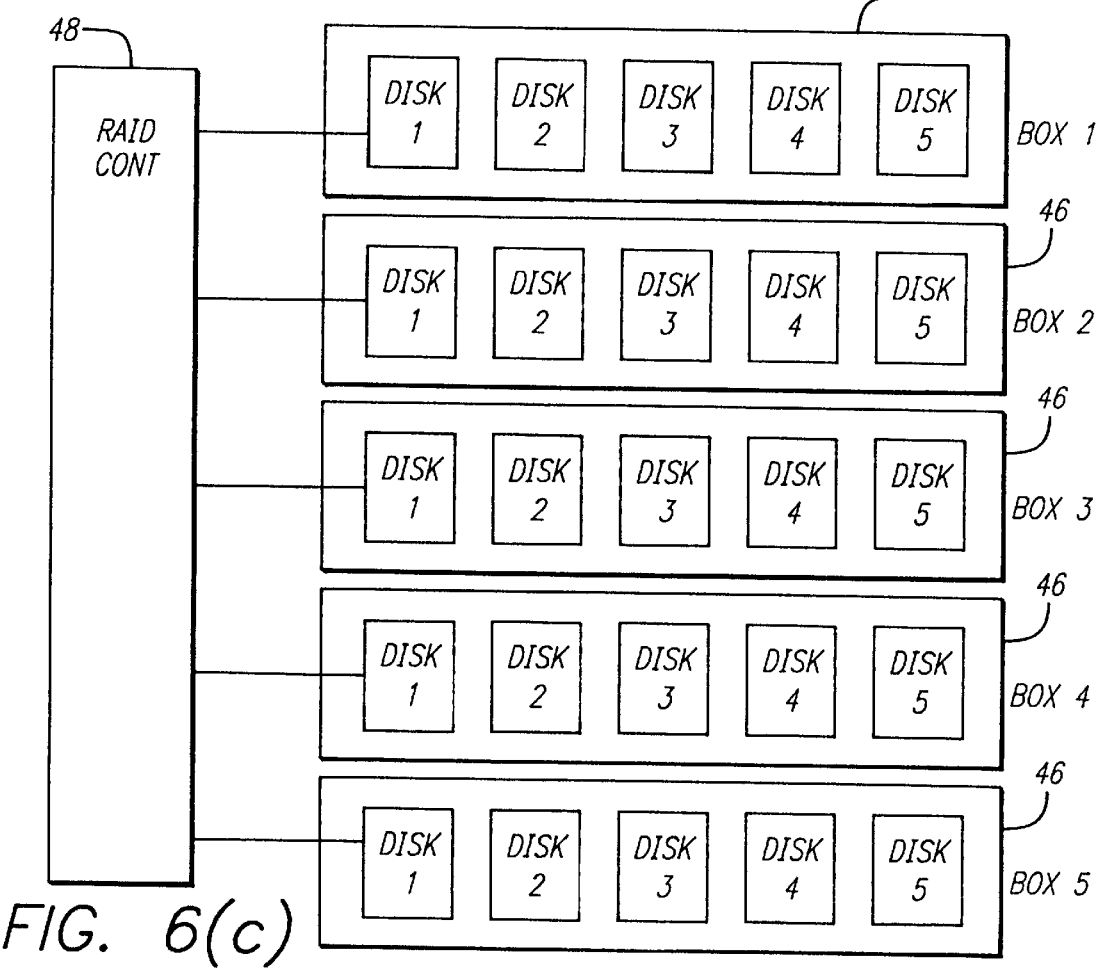

FIGS. 6(*a*), (*b*) and (*c*) show a variety of configurations for the disk drives. FIG. 6(*a*) provides a block diagram illustrating the network of the disk drives 12 within the housing 10 via bus 42 to a SMART, SCSI, or IDE controller preferably located in the computer. In most modern computers, such a controller 44 automatically determines the number of drives and the protocol necessary to access each drive.

As seen in FIG. 6(*a*), the disk drives are interconnected in series. As seen in FIG. 6(*b*), the disk drives are connected and parallel. As seen in FIG. 6(*c*), the disk drives are connected in series wherein each assembly 46 is joined with other assemblies to form an array and controlled by a RAID controller 48. Although the assemblies 46 in FIG. 6(*c*) show the disk drives connected in series, naturally, they can also be connected in parallel as seen in FIG. 6(*b*). The assemblies 46 therefore form tiers of redundant storage.

Accordingly, the modular nature of the components permit easy and convenient maintenance and replacement of damaged or defective data storage devices. Their arrangement in an array takes advantage of RAID concepts to avoid irretrievable data loss.

What is claimed is:

1. A modular disk drive unit, comprising:
    a housing enclosure having an internal open area and a front opening communicating with said open area;
    a plurality of guide members mounted in said housing enclosure and defining a plurality of hard disk drive bays in said open area, each of said hard disk drive bays communicating with and being accessible through said front opening;
    a backplane mounted in a back of said housing enclosure;
    plug-in connectors attached to said backplane and positioned in a back of said housing enclosure so as to correspond to each of said hard disk drive bays;
    a plurality of hard disk drives, each being adapted to be slid along said guide members into a respective said hard disk drive bay and to thereby electrically connect to a respective said plug-in connector;
    a data bus disposed in said housing enclosure for operatively interconnecting said hard disk drives when in respective said hard disk drive bays;
    at least one connector at a back of said housing enclosure and to which said bus is operatively connected; and
    a fan mounted in a back of said housing enclosure for drawing cooling air through cooling vents of said disk drives, said fan being controlled by an interior temperature sensor in said housing enclosure;
    wherein said housing enclosure has exterior dimensions corresponding to interior dimensions of an industry standard expansion bay in a personal desktop computer having therein a RAID controller such that said modular disk drive unit enclosure is operatively mountable in the expansion bay by inserting said housing enclosure therein as a self-contained unit and thereby into an operative insert position; and
    wherein with said housing enclosure in the operative insert position, said hard disk drives are operatively connected to the RAID controller via said at least one connector.

2. The modular disk drive unit of claim 1 further comprising a DC power connector on a back side said housing enclosure and electrically connectable to the personal computer in the expansion bay when said housing enclosure is in the operative insert position.

3. The modular disk drive unit of claim 1 wherein said at least one connector is an in/out port.

4. The modular disk drive unit of claim 1 wherein said disk drives are connected in series in said housing enclosure.

5. The modular disk drive unit of claim 1 wherein said disk drives are connected in parallel in said housing enclosure.

6. The modular disk drive unit of claim 1 further comprising a data bus disposed in said housing enclosure for operatively interconnecting said hard disk drives when operatively in respective said hard disk drive bays.

7. The modular disk drive unit of claim 1 further comprising a fan mounted in a back of said housing enclosure for drawing cooling air through front cooling vents of said disk drives, said fan being controlled by an interior temperature sensor in said housing enclosure.

8. The modular disk drive unit of claim 1 further comprising a DC power connector on a back of said housing enclosure for operative power connection in the personal computer when said housing enclosure is in the operative insert position.

9. A modular disk drive assembly and personal desktop computer system, comprising:
    a personal desktop computer having an industry standard expansion bay;
    a housing enclosure having an internal open area and a front opening communicating with said open area;
    a plurality of guide members mounted in said housing enclosure and defining a plurality of hard disk drive bays in said open area, each of said hard disk drive bays communicating with and being accessible through said front opening;

a backplane mounted in a back of said housing enclosure;

plug-in connectors attached to said backplane and positioned in a back of said housing enclosure so as to correspond to each of said hard disk drive bays;

a plurality of hard disk drives, each being adapted to be slid along said guide members into a respective said hard disk drive bay and to thereby electrically connect to a respective said plug-in connector; and a fan mounted in a back of said housing enclosure for drawing cooling air through front cooling vents of said disk drives, said fan being controlled by an interior temperature sensor in said housing enclosure;

wherein said housing enclosure has exterior dimensions corresponding to interior dimensions of said expansion bay such that said housing enclosure is operatively mountable in said expansion bay by inserting said housing enclosure therein as a self-contained unit.

10. The system of claim 9 wherein each said hard disk drive includes a front handle for grasping and pulling said hard disk drive out of a respective said hard disk drive bay.

11. The system of claim 9 wherein said disk drives are connected in series in said housing enclosure.

12. The system of claim 9 wherein said disk drives are connected in parallel in said housing enclosure.

13. The system of claim 9 wherein said industry standard expansion bay is a one and a half height disk drive bay.

14. The system of claim 9 wherein said industry standard expansion bay is a full height disk drive bay.

15. The system of claim 9 wherein said industry standard expansion bay is a half height disk drive bay.

16. The system of claim 9 wherein said industry standard expansion bay comprises a 5.25-inch form factor full height disk drive bay.

17. The system of claim 9 wherein said industry standard expansion bay comprises a 5.25-inch full height plus 5.25-inch half height disk drive bay.

18. The system of claim 9 wherein said industry standard expansion bay comprises a drive bay size selected from a group consisting of 1.8-inch or 2.5-inch.

19. The system of claim 9 further comprising a data bus disposed in said housing enclosure for operatively interconnecting said hard disk drives when operatively in respective said hard disk drive bays.

20. The system of claim 19 wherein a controller is in said personal desktop computer, and with said housing enclosure operatively in said expansion bay said controller is operatively connected to said data bus.

21. The system of claim 20 wherein said controller is a RAID controller.

22. The system of claim 19 further comprising an in/out port at a back of said housing enclosure and to which said bus is operatively connected.

23. The system of claim 9 further comprising LEDs associated with respective said disk drives for indicating individual operation of each of said disk drives, with said disk drives in said housing enclosure, said LEDs being visible at a front of said housing enclosure.

24. The system of claim 9 wherein said guide members comprise rails, and each said hard disk drive includes outwardly extending flanges which slide on said rails.

25. The system of claim 9 wherein said housing enclosure includes mounting openings for installing said housing enclosure directly in and to said expansion bay.

26. The system of claim 25 wherein said mounting openings include side mounting slots.

27. The system of claim 25 wherein said mounting openings include side screw holes.

28. A computer operation method, comprising the steps of:

providing a personal desktop computer having an industry standard expansion bay therein;

providing a housing enclosure having external dimensions corresponding to internal dimensions of the expansion bay, the housing having an internal open area and a front opening communicating with the open area;

providing guide members mounted in the housing enclosure and defining a plurality of hard disk drive bays in the open area, each of the hard disk drive bays communicating with and being accessible through the front opening;

providing plug-in connectors supported by the housing enclosure and positioned to correspond to each of the hard disk drive bays;

providing a DC power connector on a back of the housing enclosure;

sliding separate hard disk drives along the guide members into respective hard disk drive bays and thereby electrically connecting to a respective plug-in connector and operatively to the DC power connector; and inserting the housing enclosure as a self-contained unit into the expansion bay and thereby plugging, at a location inside of the computer and via the DC power connector, into a power supply of the computer.

* * * * *